Jan. 1, 1963 G. A. DAVIS ETAL 3,070,880
METHOD OF BONDING THE ABUTTED EDGES OF METAL MEMBERS
Filed Sept. 30, 1959 2 Sheets-Sheet 1
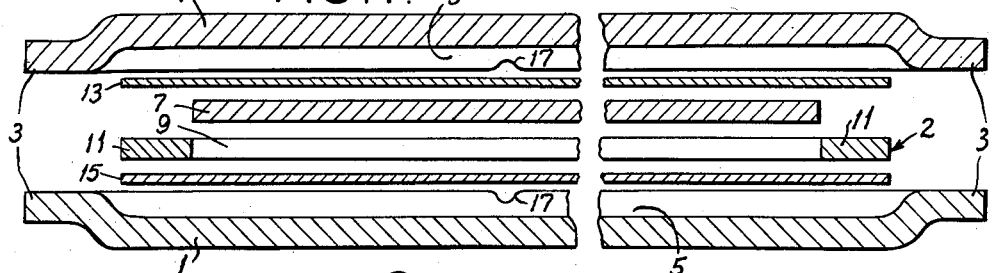
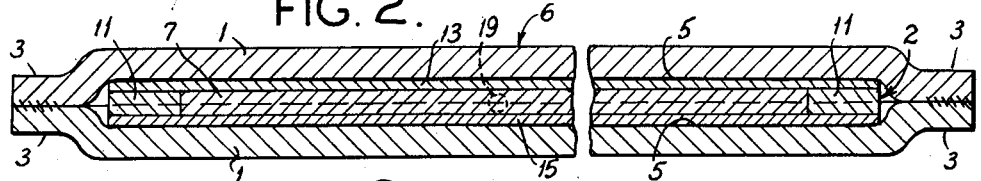
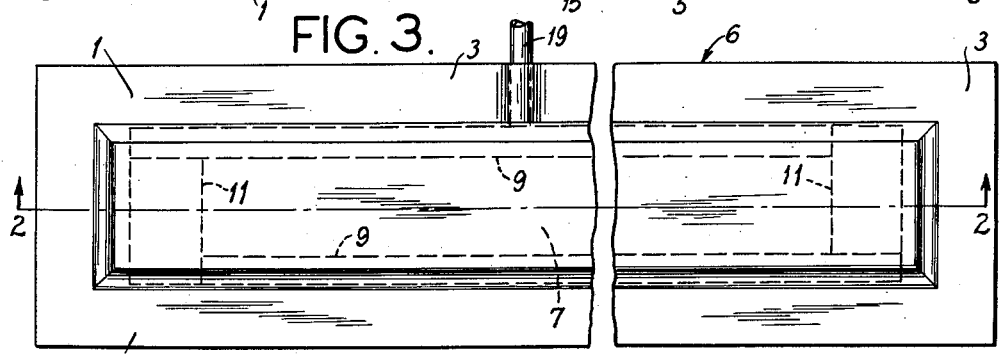
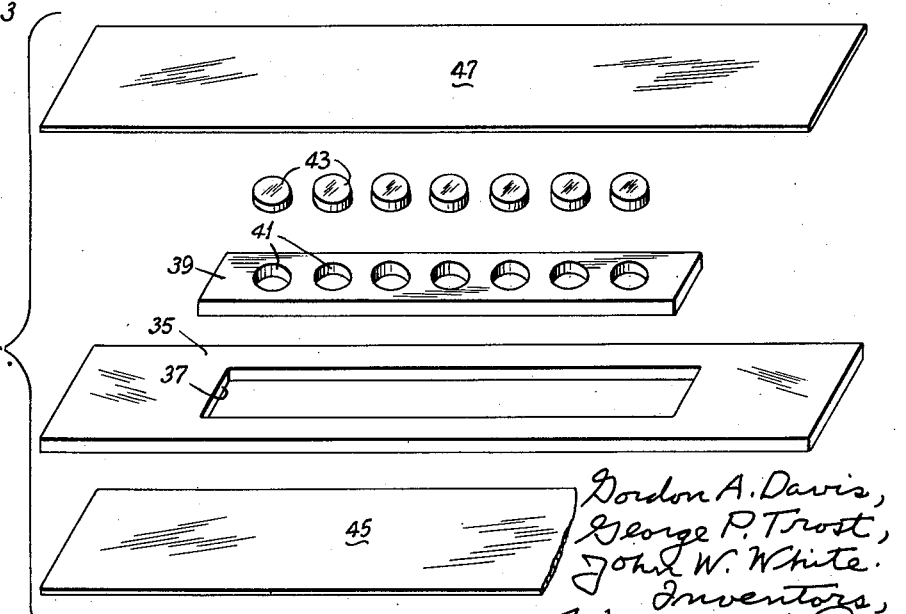
Gordon A. Davis,
George P. Trost,
John W. White.
Inventors,
Koenig and Pope,
Attorneys.

Jan. 1, 1963 G. A. DAVIS ETAL 3,070,880
METHOD OF BONDING THE ABUTTED EDGES OF METAL MEMBERS
Filed Sept. 30, 1959 2 Sheets-Sheet 2
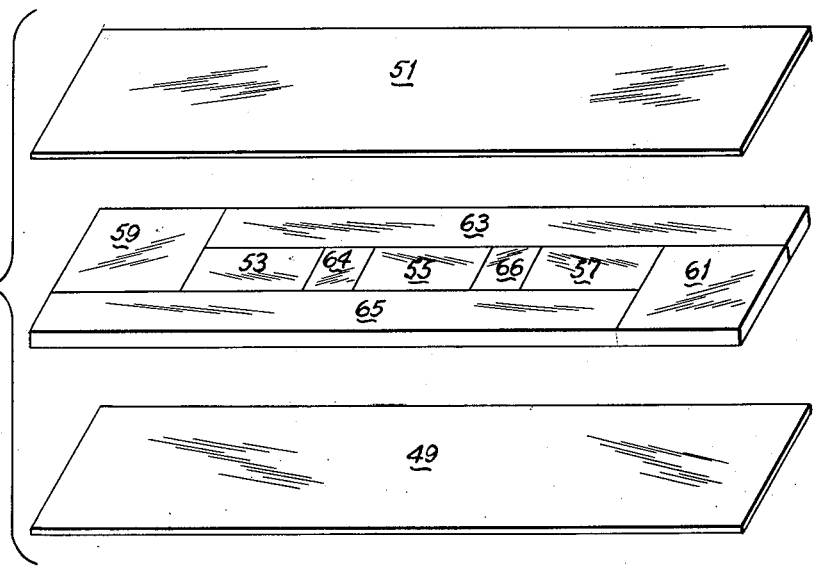
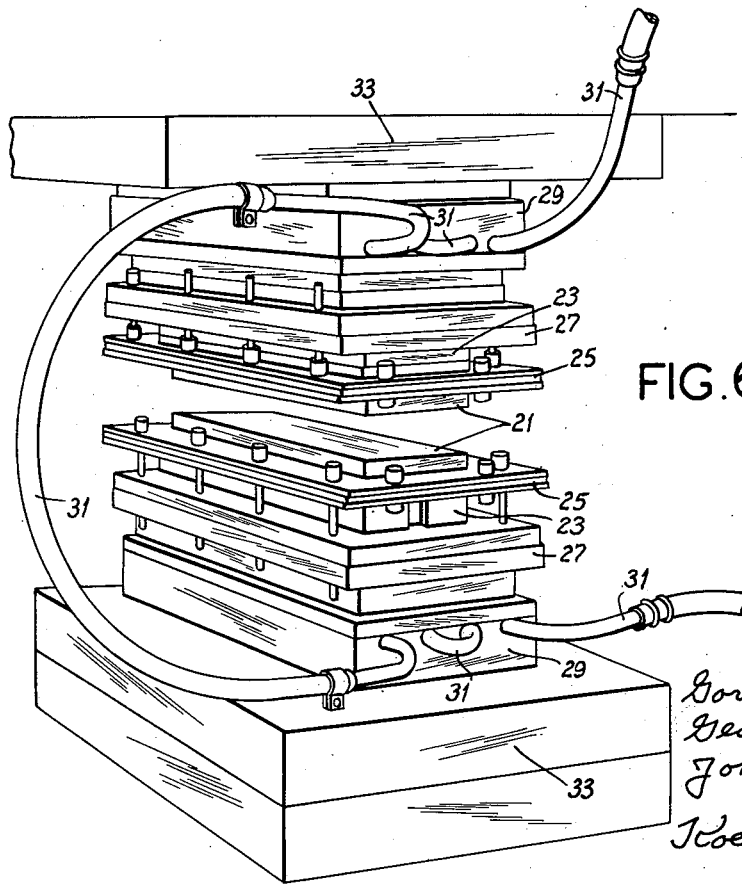

United States Patent Office 3,070,880
Patented Jan. 1, 1963

3,070,880
METHOD OF BONDING THE ABUTTED EDGES OF METAL MEMBERS
Gordon A. Davis, Attleboro, George P. Trost, North Attleboro, and John W. White, Attleboro, Mass., assignors, by mesne assignments, to Texas Instruments Incorporated, Dallas, Tex., a corporation of Delaware
Filed Sept. 30, 1959, Ser. No. 843,387
7 Claims. (Cl. 29—471.1)

This invention relates to the bonding of metals, and with regard to certain more specific features, to the edge-bonding and cladding of metals under solid-phase bonding conditions.

Among the several objects of the invention may be noted the provision of a reliable and low-cost method of producing structures requiring reliable butt-type edge-bonding of accurately shaped pieces without substantial distortion of the edge shapes and in addition, as required, face-bonding of additional pieces, whereby edge-bonded abutments may be produced for structures such as, for example, nuclear fuel elements or the like requiring accurate geometries of the bonded and clad cores; the provision of a method of the class described which eliminates the occurrence of geometric distortions in either simple or complex geometries of such bonded components as have heretofore been caused by shape-destroying so-called fishtailing, dog-boning and feather-edging inherent in the former processes employed; the provision of a method of the class described adapted for the production of high-quality products having safe, strong and substantially noncorrodible bonds; and the provision of a method of this class which reduces the amount of scrap, and numbers of rejects and errors. Other objects and features will be in part apparent and in part pointed out hereinafter.

The invention accordingly comprises the steps and sequence of steps, and features of manipulation, which will be exemplified in the methods hereinafter described, and the scope of which will be indicated in the following claims.

In the accompanying drawings, in which several of various possible embodiments of the invention are illustrated, FIG. 1 is a diagrammatic exploded cross-sectional view of parts illustrating one form of the invention, certain thicknesses being greatly exaggerated for clarity;

FIG. 2 is a cross section showing the parts of FIG. 1 assembled in a package preparatory to bonding, the view being taken on line 2—2 of FIG. 3;

FIG. 3 is a plan view of FIG. 2;

FIG. 4 is an exploded isometric view illustrating another form in which the invention may be carried out;

FIG. 5 is a view similar to FIG. 4, illustrating another form of the invention; and, FIG. 6 is a perspective view of a typical press for carrying out certain steps in the process.

Corresponding reference characters indicate corresponding parts throughout the several views of the drawings.

In certain bonded metal products it is important that there shall be abutted edge-bonding of accurate edge geometry which may be simple or complex. An example, though not the only one, of such a product is a nuclear fuel element in which a core member is butt-edge-bonded to a surround and the core and surround are face-bonded with cladding pieces. There are also cases in which it is desired to insert into openings in such cores or the like closely fitting pellets of materials which may be non-metallic, such as oxides, ceramics or the like; or cermets. In such case the invention produces an advantageous abutting close-fitting surround for the pellets by the core, although the core may not be bonded to such pellets. The core material in a nuclear fuel structure above referred to may, for example, be Zircaloy II-uranium alloy, edge-bonded and clad with Zircaloy II. As known, Zircaloy II consists by weight of 1.5% tin, 0.12% iron, 0.10% chromium, 0.05% nickel and the balance zirconium. Zircaloy II-uranium alloy may consist of, for example, 5% (more or less) by weight of uranium, less than 1% boron and the remainder Zircaloy II. The first form of the invention to be described will concern these materials as an example. Other examples will also be given, but it is to be understood that the invention has application to the edge-bonding of many metal components. The term metals as used herein includes alloys. The term solid-phase bonding means bonding without the occurrence of any substantial liquid-phase or undesirable intermetallic compounds in any appreciable amount in the bonds. Such undesirable compounds may be, for example, brittle intermetallic compounds. Hereinafter, Zircaloy II-uranium alloy will be referred to by the abbreviation Zircaloy II alloy.

In former bonding processes, a considerable increase in the interfacial area of bonding was employed at some point in the solid-phase bonding procedure, but in the case of edge or like bonding, such deformation, if substantial, is not permissible if an accurate geometry of the edge is to be maintained. By means of the process herein, substantial interfacial bonding area increase, with its consequent geometric distortion of the edge or like bonds, is avoided.

Referring now more particularly to FIGS. 1–3, there are shown two flat flexible jacket-forming plates 1, composed, for example, of 1010 cold rolled steel. These plates may be 5" wide, 21" long and approximately .080" thick. They are embossed to form flanges as shown at 3, and pockets as shown at 5. These plates 1, after location therebetween of the parts to be bonded, are brought together and edge-welded at the flanges 3 so as to provide a sealed flexible envelope or jacket 6 containing the parts to be bonded (FIGS. 2 and 3).

In the example shown in FIGS. 1–3, the parts to be jacketed consist of an interior Zircaloy II alloy core sheet 7 approximately 2.8" wide, 18" long and .045" thick. This core 7 is to be surrounded by a Zircaloy II frame or surround 2 which is to be 4" wide, 20" long and also .045" thick. This frame is made up of side pieces 9 which are 0.6" wide, 19" long and .045" thick, and also by end pieces 11 which are 1" wide, 3.4" long and .045" thick. The pieces 9 and 11 make up said frame or surround 2. At numerals 13 and 15 are shown cladding sheets, each of which is 4" wide, 20" long and .020" thick. The space afforded by the pockets 5 snugly contains parts 7, 9, 11, 13 and 15 when the flanges 3 are welded shut. Before insertion into the jacket 6, the parts 1, 7, 9, 11, 13 and 15 are prepared as follows:

The core piece 7 is rough-sheared and its four edges machined flat. Two edges of each frame piece 9 and 11 are machined flat. The cladding sheets 13 and 15 are sheared to size. The cold rolled steel sheets 1 are sheared, cupped and vapor-blasted to clean them. The pieces 7, 9, 11, 13 and 15 are degreased and pickled in, for example, HNO$_3$:HF. Their surfaces to be bonded are then abraded and wire-brushed, care being exercised to prevent rounding off of the corners of the abutting edges, so as to obtain a flush abutment. The purpose of the cleaning is to remove bond-deterrent materials such as oxides, grease and other contaminants, as explained in Patent 2,834,102.

In a suitable jig (not shown) core 7 is then placed on cladding 15 and surrounded closely by the framing pieces 9 and 11, cladding 13 being then applied in registry over pieces 7, 9 and 11. The outer edges of the members 9, 11, 13 and 15 are resistance spot-welded at intervals along their edges while in the jig. They are thus held in a predetermined assembled relationship before jacketing. In some instances it may be found desirable to spot-weld some component parts together as a preassembly prior to complete assembly. Spot-welding is disclosed herein as one example of various means that may be employed to hold component parts in preassembled plane relationship for ease of handling prior to and while inserting the assembly in the cupped plates 1. Thus other means may be employed for the purpose such as screws, clamps or the like.

The jacket plates 1 are provided with adjacent edge notches 17 for the reception of an evacuating tube 19, welded into place when the margins 3 of the plates 1 are welded together with the contained spot-welded assembly 7, 9, 11, 13, 15. Welding of the jacket may be accomplished with an inert tungsten arc so as not to spoil the cleaned surfaces of the assembly therein. As contained in the closed jacket 6, the core 7 and frame pieces 9 and 11 are coplanar with their edges in substantially good abutted alignment. The pieces 7, 9 and 11 are also in good interfacial contact with the cladding sheets 13 and 15. The tube 19 is attached to vacuum apparatus for drawing a substantial vacuum within the welded jacket and around the parts contained therein. The tube 19 may then be pinched off to provide a static vacuum; or, as is preferable, the tube may through flexible tubing be left in communication with a vacuum pump to produce a dynamic vacuum during subsequent operations. A 50 micron vacuum is appropriate. Before evacuation, the tube 19 may be employed for preliminary flushing of the jacket contents with an inert gas such as argon, but this is not always necessary. For some materials composing the assembly in the jacket, air may be flushed out from the interior of the jacket and the jacket thereafter charged with any desired nonoxidizing substance such as helium, instead of maintaining a vacuum. In some cases an oxygen charge will be satisfactory after air has been flushed out; for example, when the members to be bonded are capable without damage of absorbing the small amount of oxygen trapped in the jacket 6. It will thus be seen that in any event an appropriate nondeleterious atmosphere is to be maintained around the contents of the jacket after welding. In most cases the evacuating process is preferred as an appropriate atmosphere.

It is preferred that the edges in the assembly as held together by the spot-welding of its parts 7, 9, 11, 13, and 15 shall be in good linear contact but several thousandths of an inch clearance are acceptable in view of the void-reducing nature of the succeeding steps in the process. It is also preferred that the pieces 7, 9, 11, 13 and 15 shall be in a cold-worked condition at the time that they are prepared for insertion into the jacket, although this may not be necessary in all cases.

After the jacket has been welded shut with the cleaned and aligned cold-worked parts 7, 9, 11, 13 and 15 therein, and evacuated, the next step in the process is to apply the jacketed assembly shown in FIG. 3 between the plates 21 of a press such as shown in FIG. 6. These plates 21 are preferably 5" wide, 21½" long and 1" thick and composed of a rigid material such as a nickel base alloy, for example, Hastelloy. The plates 21 are backed by insulation block 23 composed, for example, of Transite. Suitably insulated copper induction coils 25, made in conventional manner, surround plates 21 and are suitably energized to heat the plates inductively. Other heating means may, however, be employed, as for example resistance heating. The press parts thus described are further backed by heat-insulating asbestos (Transite) plates 27. These also serve as supports for the coils. Behind the plates 27 are water-cooled back-up plates 29, the water-cooling system with flexible connections being indicated at 31. The cooling water may circulate at about 110° F. Each assembly 21, 23, 25, 27, 29, 31 is attached to a movable press platen 33. The induction coils 25 produce a temperature in the plates 21 on the order of 1625° F. for the materials of the example under present consideration.

Each loaded jacket such as shown in FIG. 3 is introduced between the plates 21 preferably while the jacket and its contents are cold, or if heated, then preferably only to a temperature below that of the press. Some such preheating may be desired in order to conserve press heating times. Before insertion into the press, the outside of the jacket parts 1 may be provided with a suitable parting compound such as magnesia, zirconia, alumina or graphite in a suitable suspension, to prevent sticking to the plates 21. The press platens 33 are then moved toward one another with a force on the jacket adapted to produce a pressure on the order of 3½ tons per square inch in the present example. Substantially all of this pressure is transmitted through the flexible steel jacket pieces 1 to the assembled contents in the jacket normal to the plane of the contained assembly. The application of this pressure occurs before the jacket and its contents rise substantially in temperature. The temperature of the jacket and its contents reaches about 1625° F. while they are under said pressure. The duration of application of the required pressure under the temperature stated is 10 minutes or so in the present case. The temperature is such as to effect diffusion across adjacent edge and interfacial surfaces without the production of an intervening liquid phase or undesirable intermetallic compounds. This not only causes bonding but elimination of any voids by opposed thermal expansion of abutting metals at the voids. The voids are originally caused by small misalignments at edge abutments.

As stated, it is preferable that the temperature of the contents of jacket 6 be less than that of the press at the time pressure is applied, so that heat flows into the parts such as 7, 9, 11, 13 and 15 while they are clamped.

Under the stated conditions, solid-phase bonding diffusion takes place across the protected, cleaned and abutted surfaces, both interfacially and intermarginally, to bring about practically voidless bonding all around the core 7, including its faces and edges. This occurs even though small voids may have existed between parts to be bonded prior to heating. The solid-phase bonding by diffusion eliminates these without any substantial distortion of the geometry desired at the interfaces.

Next the pressure is released by opening the press, tube 19 being at this time pinched off, if not already so pinched off. The jacketed assembly will then cool. While it is not always necessary, the assembly after removal from the press may be heated or reheated at 1650° F. for one-half hour in order further to perfect the bond for such products as require a very high corrosion resistance under unusual operating conditions. Thereafter the bonded parts 7, 9, 11, 13 and 15 are dejacketed, being then ready for any additional finishing operations thereon as may be required. This dejacketing is accomplished by machining open the welds 3 by any convenient machining operation, such as shearing, sawing, milling or the like. Since the outsides of the cladding pieces 13 and 15 and insides of the jacket pieces 1 were not originally cleaned sufficiently to effect bonding, the pieces 1 may readily be stripped from the bonded assembly 7, 9, 11, 13 and 15. In some cases it may be found necessary, as is known, to use a parting medium to prevent adherence of the jacket pieces to the bonded assembly.

It is possible, but not desirable in all cases, to apply pressure to the FIG. 3 or like assembly while the press is relatively cool and then to heat the press to the desired temperature. If this is done, not only is the time thus required for successive cycles of operation increased with a loss of production rate, but also some bond failures may result for some metals. It is therefore preferred to keep the press hot and introduce relatively cooler assemblies, and in each case quickly apply the pressure before heat has had an opportunity to flow into the assembly being pressurized. The inflow of heat from the press thereafter raises the temperature to the desired amount while the jacket and its contents are under pressure.

In FIG. 4 is shown an array of analogous elements adapted to be carried through the process above described but of somewhat different forms. In this case, numeral 35 indicates a one-piece frame element in which is a rectangular window opening 37 for the reception of a complementary rectangular core element 39. Again the element 35 may be composed of Zircaloy II and the core element 39 composed of Zircaloy II alloy. In the core 39 are, for example, a number of round holes 41 for the snug reception of pellets 43 equal in thickness to core 39 and composed, for example, of uranium dioxide ($UO_2$). Or these might be composed of some desired cermet or ceramic. The pellets 43 may be cleaned by heating. In some cases they may require a coating of graphite to minimize reactions with the surrounding material. Numerals 45 and 47 indicate cladding plates of Zircaloy II.

After appropriate cleaning as above described, the frame piece 35 may be placed on the cladding plate 45. Then the core 39 is introduced into the opening 37 and the slugs 43 placed in openings 47. The assembly of aligned parts 35, 39 and 43 is then covered by cladding plate 47 and held by spot-welding or the like as above described. The spot-welded assembly is then placed in a steel holding jacket of the type above described, which is welded shut, flushed, and/or evacuated and the whole pressed and heat-treated as above stated. Edge-bonding occurs between parts 35 and 39 and interfacial bonding between the remaining interfaces. Bonding does not occur between the metal of member 39 and the uranium oxide pellets 43, but the latter are more tightly enclosed in the resulting bonded assembly than when the pellets were originally inserted.

In FIG. 5 is shown another form of the invention, illustrating the fact that more than one core piece may be employed with a surrounding framework between cladding pieces. In this case the cladding pieces of Zircaloy II are shown at numerals 49 and 51. Between these are sandwiched the coplanar assembly consisting of three core pieces 53, 55 and 57 of Zircaloy II alloy, surrounded by frame pieces 59, 61, 63, 65, 64 and 66 of Zircaloy II. All pieces are prepared and cleaned as above described. The assembly is made up by sandwiching pieces 53, 55, 57, 59, 61, 63, 64, 65 and 66 (as organized in FIG. 5) between the cladding pieces 49 and 51 and spot-welding the cover plates and outside edge pieces, thus establishing the latter as a multi-piece surround or framework. In this case the inner pieces 64 and 66 function as additional cross framework for the core pieces 53, 55 and 57. The spot-welded assembly is then enclosed in a welded jacket as above described. The jacketed assembly is thereafter placed in the press of FIG. 6 and pressed and heated, and thereafter removed under the conditions above set forth.

It will be understood that other more complex single or multiple straight-sided and/or curve-sided core shapes may be framed in a solid or multiple-piece conjugate or complementary window frame and sandwiched between cladding sheets as above described to form any desired arrangements of core and surrounding materials. Simpler core, frame and cladding figures may also be employed, such as, for example, circular cores in washer-shaped frames between circular cladding members.

Although the above examples relate to the bonding of Zircaloy II alloy and Zircaloy II, it is to be understood that these are not the only metals that may be employed in the process. Thus many metals A and B may be used, either one for a core or core elements and either one for the frame and cladding elements. Different metals may require some variations in the bonding time, pressure and temperature. Examples of such variations are given in the following table of conditions for the metals A and B indicated, assuming a vacuum as the atmosphere in the jacket during compression in the press:

TABLE

| Edge-bonded metals | | | | Press conditions | | | Post press annealing | |
|---|---|---|---|---|---|---|---|---|
| Metal A | Thickness (in.) | Metal B | Thickness (in.) | Temp. (° F.) | Pressure (t.s.i.) | Time (min.) | Temp. (° F.) | Atmosphere |
| Zircaloy II | .045 | Zr | .045 | 1,650 | 3.5 | 30 | | |
| Do | .045 | Ti | .045 | 1,850 | 3.5 | 30 | | |
| Do | .045 | Nb | .045 | 1,850 | 3.5 | 30 | | |
| Do | .045 | Zircaloy Alloy | .045 | 1,625 | 3.5 | 10 | 1,650 | Vac |
| Do | .045 | Zircaloy II | .045 | 1,625 | 3.5 | 10 | 1,650 | Vac |
| Zircaloy Alloy | .045 | Zircaloy Alloy | .045 | 1,625 | 3.5 | 10 | 1,650 | Vac |
| Zr | .045 | Zr | .045 | 1,650 | 3.5 | 30 | | |
| Ti | .045 | Ti | .045 | 1,650 | 3.5 | 30 | | |
| Ni | .045 | Cu | .045 | 1,400 | 3.5 | 30 | | |
| Ni | .045 | Ni | .045 | 1,400 | 3.5 | 30 | | |
| Ni | .045 | Brass [2] | .045 | 1,400 | 3.5 | 30 | | |
| Cu | .045 | Cu | .045 | 1,250 | 3.5 | 30 | | |
| Cu | .045 | Bronze [3] | .045 | 1,400 | 3.5 | 30 | | |
| Cu | .045 | Fe [1] | .045 | 1,250 | 3.5 | 30 | 1,600 | H[2] |
| Cu | .045 | Bronze [3] | .045 | 1,400 | 3.5 | 30 | | |
| Cu | .045 | Brass (Scovill 20) | .045 | 1,400 | 3.5 | 30 | | |
| Brass (Scovill 20) | .045 | Bronze [3] | .045 | 1,250 | 3.5 | 30 | 1,600 | H[2] |
| Do | .045 | Brass (Scovill 20) | .045 | 1,400 | 3.5 | 30 | | |
| Do | .045 | Ag | .045 | 1,385 | 3.5 | 30 | | |
| Fe [1] | .045 | Fe [1] | .045 | 1,400 | 3.5 | 30 | | |
| Bronze [3] | .045 | Bronze [3] | .045 | 1,400 | 3.5 | 30 | | |
| Do [3] | .045 | Fe [1] | .045 | 1,550 | 3.5 | 30 | | |
| Brass [2] | .045 | Brass [2] | .045 | 1,400 | 3.5 | 30 | | |
| Do [2] | .045 | Cu | .045 | 1,400 | 3.5 | 30 | | |
| Do [2] | .045 | Ag | .045 | 1,385 | 3.5 | 30 | | |
| Do [2] | .045 | Brass (Scovill 20) | .045 | 1,400 | 3.5 | 30 | | |
| Hf | .045 | Hf | .045 | 1,850 | 3.5 | 30 | | |
| Ag | .045 | Cu | .045 | 1,385 | 3.5 | 30 | | |
| Ag | .045 | Bronze [3] | .045 | 1,385 | 3.5 | 30 | | |
| Ag | .045 | Ni | .045 | 1,385 | 3.5 | 30 | | |
| Ag | .045 | Au | .045 | 1,385 | 3.5 | 30 | | |
| Au | .045 | Brass (Scovill 20) | .045 | 1,385 | 3.5 | 30 | | |
| Au | .045 | Ni | .045 | 1,385 | 3.5 | 30 | | |
| Au | .045 | Bronze [3] | .045 | 1,385 | 3.5 | 30 | | |
| Ti | .045 | Ta | .045 | 1,850 | 3.5 | 30 | | |
| Pt | .045 | Zr | .045 | 1,850 | 3.5 | 30 | | |
| Pt | .045 | Zircaloy II | .045 | 1,850 | 3.5 | 30 | | |

[1] Fe—1010 cold rolled steel.
[2] Brass: Cu, 70%; Zn, 30%.
[3] Bronze: Class "C": Sn, 9%–11%; Pb, 9%–11%; Zn, Sb, Ni, 0.5 Max Cu-Bal.

In practice, savings on the order of 25% or more can be realized by using the present method for producing edge-bonded or like units of the type described. Although the process produces a highly accurate form of edge bond without a reduction step such as rolling, this does not preclude the use of a subsequent reduction of the product by rolling after it has been edge-bonded, if desired. Being accurately edge-bonded, distortion of the edge geometry by rolling is minimized.

It will be understood that suitable controls of temperature, time and pressure are obtained by well-known instrumentation at the press.

The effectiveness of the invention has been established by tests for ascertaining the successfulness of the bonding, including separation and cyclic bend tests, ultrasonic tests, metallographic and radiographic examination for grain structure and voids, and water and steam corrosion tests under high pressures. All indicate the effectiveness of the process described.

From the above it will be apparent that bonding of clad assemblies such as described takes place under two different conditions as follows:

(1) In the first place, bonding between the faces of the sandwiched pieces and of the adjacent faces of the cladding sheets takes place under pressure from the press directed normally to these faces, and the direction of diffusion between these faces is generally in the direction of this force exerted by the press.

(2) In the second place, the abutted complementary surface portions of the sandwiched pieces are substantially parallel to the direction of said force and are therefore not directly pressed together by such force. In the latter case the general direction of the diffusion occurs at right angles to the force. We believe that at least in some instances a secondary force may occur, tending to press together the complementary surfaces. This is for the reason that when the jacketed assembly is placed in the press at a temperature below that of the press, the juxtaposed pieces are comparatively cool. After the pressure is applied by the press, the juxtaposed pieces become clamped against transverse movements. Accordingly, any thermal expansion caused by heating, combined with plastic flow, after the press closes may tend to drive the juxtaposed complementary surfaces together as diffusion occurs. Any such force is a secondary force and not a component of the primary holding force of the press.

In view of the above, it will be understood that any two metal parts, for example, such as two parts 7 and 9 (FIG. 3) or two parts such as 53 and 64 (FIG. 5), may be complementarily formed, cleaned and positioned in a jacket such as 1, after which pressure may be applied through the jacket normal to their unclad faces while applying heat to raise the temperature of the pieces. The result will be a solid-phase diffusion bond between the juxtaposed surfaces of the parts. Thus the invention has applicability to the bonding of any two juxtaposed surfaces of nonclad parts introduced while relatively cool and in protective atmosphere into a press and subjecting the pieces to pressure while warming to the desired bonding temperature, the latter being maintained for the appropriate time in the press. As a result, said pressure will be in a direction parallel to the juxtaposed surfaces as they become bonded.

It is apparent from the above description that the use of a jacket for maintaining a nondeleterious atmosphere around the assembly to be welded has many advantages and is preferable. It is to be understood, however, that the assembly of parts to be welded may be formed as described and without the use of a jacket placed between the press platens for squeezing, provided the entire press is located in the desired nondeleterious atmosphere, or at least that the space around platens is surrounded by such an atmosphere during the time that the assembly is pressurized and bonded.

In view of the above, it will be seen that the several objects of the invention are achieved and other advantageous results attained.

As various changes could be made in the above methods without departing from the scope of the invention, it is intended that all matter contained in the above description or shown in the accompanying drawings shall be interpreted as illustrative and not in a limiting sense.

We claim:

1. The method of edge-bonding and cladding metal pieces having pairs of opposite faces; comprising forming said pieces with linearly complementary clean edge surfaces which extend substantially perpendicularly with respect to said faces, placing said edge surfaces together in edgewise close complementary abutting relationship with minimized voids therebetween, placing clean cladding pieces in interfacial contact against opposite clean faces of said pieces and extending across the complementary edge surfaces to form an assembly, locating the assembly while comparatively cool in a press which has been preheated to a substantial degree of temperature adapted for rapid substantial solid-phase bonding of said pieces, quickly applying a substantial but essentially nondeforming pressure by the heated press to said assembly perpendicularly to said faces over a substantial area adjacent the edge surfaces to prevent any substantial transverse sliding movements of the parts of the assembly, substantially holding said pressure for a period of time sufficient to effect a substantial elimination of said voids and growth of a substantial solid-phase bond across said edge surfaces, and thereafter removing said assembly.

2. The method of edge-bonding and cladding metal pieces having pairs of opposite substantially parallel faces which are substantially equally spaced; comprising forming said pieces with linearly complementary clean edge surfaces which extend substantially perpendicularly with respect to said faces, placing said edge surfaces together in edgewise close complementary abutting relationship with minimized voids therebetween, placing clean cladding pieces in interfacial contact against opposite clean faces of said pieces and extending across the close complementary edge surfaces, holding together at least some of the pieces to form an assembly, locating said assembly within a flexible jacket adapted when sealed to transfer press-induced pressure from its outside to said pieces throughout their opposite faces perpendicularly to said faces, sealing the jacket, maintaining a nondeleterious atmosphere in the jacket, locating the jacket while comparatively cool in a press which is preheated to a substantial degree of temperature adapted for rapid substantial solid-phase bonding of said pieces, quickly applying a substantial but essentially nondeforming pressure by the preheated press through said jacket perpendicularly to said faces over a substantial area to prevent any substantial transverse sliding movements of parts of the assembly, substantially contemporaneously maintaining said pressure and temperature throughout a period of time sufficient to effect a substantial elimination of said voids and to effect growth of a substantial solid-phase bond across said edge surfaces, and thereafter removing said jacket.

3. The method according to claim 2, wherein said atmosphere is constituted by a vacuum in said jacket.

4. The method of edge-bonding and cladding metal pieces having pairs of opposite substantially parallel faces which are substantially equally spaced; comprising forming said pieces with linearly complementary clean edge surfaces which extend substantially perpendicularly with respect to said faces, placing said edge surfaces together in edgewise close but loose complementary relationship with minimum voids therebetween, placing clean cladding pieces in interfacial contact against opposite clean faces of said pieces and extending across the loose but close complementary edge surfaces, attaching together at least some of the pieces to form an assembly, locating said assembly within a flexible jacket adapted to transfer press-induced pressure from its outside to said pieces throughout their opposite faces perpendicularly to said faces, sealing the jacket, maintaining a vacuum in the jacket, locating the jacket while comparatively cool in a press which has been preheated to an ultimate substantial degree of temperature adapted for rapid substantial solid-phase bonding of said pieces by continuous application thereto of heat at said degree of temperature, quickly applying a substantial but essentially nondeforming ultimate pressure from the preheated press through said jacket perpendicularly to said faces over a substantial area extending transversely across said complementary edge surfaces to prevent any substantial transverse sliding movements of parts of the assembly, substantially contemporaneously maintaining said ultimate pressure and temperature for a period of time sufficient to effect a substantial elimination of said voids and to effect growth of substantial solid-phase bonds across said edge surfaces, and thereafter removing said jacket.

5. The method according to claim 4, including the step of maintaining said vacuum through a connection between the interior of the jacket and a vacuum source.

6. The method of abutting and edge-bonding oppositely directed margins of a first metal with inwardly oppositely directed margins of a second metal, comprising forming linearly complementary clean edge surfaces across said margins, assembling said clean edge surfaces in conjugate abutting relationships, placing the assembled metals while abutted and in said relationships within a gas-tight flexible jacket to form a jacketed assembly, establishing an atmosphere in the jacket which is non-deleterious to solid-phase bonding, preheating the platens of a press to an elevated temperature adapted subsequently to effect substantial solid-phase bonding of said metals, said platens being shaped to provide clamping force on both metals over an area including the abutments, locating the jacketed assembly while substantially at normal temperature between the heated platens of the press, rapidly applying a substantial clamping pressure to said assembly by the platens while they are at said elevated temperature so as fully to clamp the assembly at said pressure while the assembly is substantially at normal temperature, said substantial clamping pressure being adapted to provide sufficient friction on the jacket and metals therein which will substantially resist sliding expansive movements thereof parallel to the press surfaces upon heating to said bonding temperature but without substantially plastic deformation of the metals, whereby the temperature of the assembly increases substantially to that of the platens and any voids at the abutments are reduced by opposed thermal expansion at the voids, maintaining said pressure and temperature of the platens for a time sufficient to effect growth of substantial solid-phase bonds between the abutting margins, withdrawing the platens while at said elevated temperature, removing said assembly from the press, and thereafter removing the jacket.

7. The method according to claim 6, wherein the margins of the second metal are fixed relative to one another before the edges of the first metal are assembled therebetween in abutting relationship.

References Cited in the file of this patent

UNITED STATES PATENTS

| | | |
|---|---|---|
| 2,691,815 | Boessenkool et al. | Oct. 19, 1954 |
| 2,820,751 | Saller | Jan. 21, 1958 |
| 2,834,102 | Pflumm et al. | May 13, 1958 |
| 2,837,818 | Storchheim | June 10, 1958 |
| 2,860,409 | Boessenkool et al. | Nov. 18, 1958 |
| 2,861,327 | Bechtold et al. | Nov. 25, 1958 |
| 2,914,847 | Storchheim | Dec. 1, 1959 |
| 2,998,642 | McCawley | Sept. 5, 1961 |